(12) United States Patent
Wen

(10) Patent No.: US 9,206,869 B2
(45) Date of Patent: Dec. 8, 2015

(54) BRAKE DISK

(71) Applicant: Yuan-Hung Wen, Chang Hua County (TW)

(72) Inventor: Yuan-Hung Wen, Chang Hua County (TW)

( * ) Notice: Subject to any disclaimer, the term of this patent is extended or adjusted under 35 U.S.C. 154(b) by 143 days.

(21) Appl. No.: 13/959,468

(22) Filed: Aug. 5, 2013

(65) Prior Publication Data

US 2015/0034431 A1    Feb. 5, 2015

(51) Int. Cl.
*F16D 65/12*    (2006.01)
*F16D 65/847*    (2006.01)
*F16D 65/02*    (2006.01)

(52) U.S. Cl.
CPC ............ *F16D 65/847* (2013.01); *F16D 65/128* (2013.01); *F16D 2065/132* (2013.01); *F16D 2065/1316* (2013.01); *F16D 2065/1324* (2013.01); *F16D 2065/1332* (2013.01); *F16D 2065/1364* (2013.01)

(58) Field of Classification Search
CPC ..... F16D 65/128; F16D 65/84; F16D 65/847; F16D 2065/1324; B62L 1/00
See application file for complete search history.

(56) References Cited

U.S. PATENT DOCUMENTS

2013/0133996 A1*    5/2013    Iwai et al. ............... 188/218 XL

FOREIGN PATENT DOCUMENTS

DE    102005033765 A1 *    1/2007

* cited by examiner

*Primary Examiner* — Anna Momper

(57) ABSTRACT

A brake disk includes a body and at least two heat dissipation members. The body has an annular portion defined thereon, and the annular portion of the body defines a central axis. The annular portion has a brake portion for a bike brake device to clamp the brake portion. The body has at least one assembling portion extended toward the central axis for connecting with a bike hub. At least one connecting portion is formed between the assembling portion and the brake portion. The connecting portion has at least one first fixing portion formed thereon. The two heat dissipation members are respectively located on two corresponding lateral sides of the body. Each heat dissipation member has at least one second fixing portion, the second fixing portion is fixedly assembled to the first fixing portion.

8 Claims, 6 Drawing Sheets

US 9,206,869 B2

BRAKE DISK

BACKGROUND OF THE INVENTION

1. Field of the Invention

The present invention relates to a disk, and more particularly to a brake disk for a bike.

2. Description of the Prior Art

There are various brake modes on generally bikes. A brake disk structure is widely used nowadays. The brake disk structure provides a brake pad to rub a brake disk for stopping a rotation of a bike wheel, so as to provide a brake motion. Thus, a high friction temperature is avoidless, and the high friction temperature would decrease a friction force between the brake disk and the brake pad; therefore, brake ability would be decreased, and a fail-safe brake would be resulted. Therefore, a heat dissipation motion is the most important issue on the brake disk structure.

A conventional brake disk comprises a bike brake plate having plural heat dissipation holes, vent holes, and assisting heat dissipation holes for the bike brake plate to provide a heat dissipation motion.

However, the conventional brake disk could increase a venting motion for dissipating heat, but said holes would reduce a structural strength of the conventional brake disk. When the conventional brake disk is clamped by a brake block, a high friction heat would be produced, so that the conventional brake disk would be deformed or broken as an unrecoverable problem. Therefore, a fail-safe brake problem would be got more serious, and a traffic accident would be easy resulted to a bike rider. Thus, the conventional brake disk is needed to be improved.

The present invention is, therefore, arisen to obviate or at least mitigate the above mentioned disadvantages.

SUMMARY OF THE INVENTION

An object of the present invention is to provide a brake disk for providing a better heat dissipation efficiency and enhancing a structural strength of the brake disk.

To achieve the above and other objects, a brake disk comprises a body and at least two heat dissipation members.

The body has an annular portion defined thereon, and the annular portion of the body defines a central axis. The annular portion has a brake portion which is remote from the central axis for a bike brake device to clamp the brake portion. The body has at least one assembling portion extended toward the central axis for connecting with a bike hub. At least one connecting portion is formed between the assembling portion and the brake portion. The connecting portion has at least one first fixing portion formed thereon.

The two heat dissipation members are respectively located on two corresponding lateral sides of the central axis of the body. Each heat dissipation member has at least one second fixing portion, the second fixing portion is fixedly assembled to the first fixing portion.

Thus, the two heat dissipation members could transmit a friction heat from a brake motion of the body to the heat dissipation members so as to provide great heat dissipation efficiency. Besides, the two heat dissipation members are respectively assembled at two corresponding lateral sides of the body so as to increase a structural strength of the body. Therefore, although a high friction heat of the body is produced, the body would not be deformed or broken easily.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
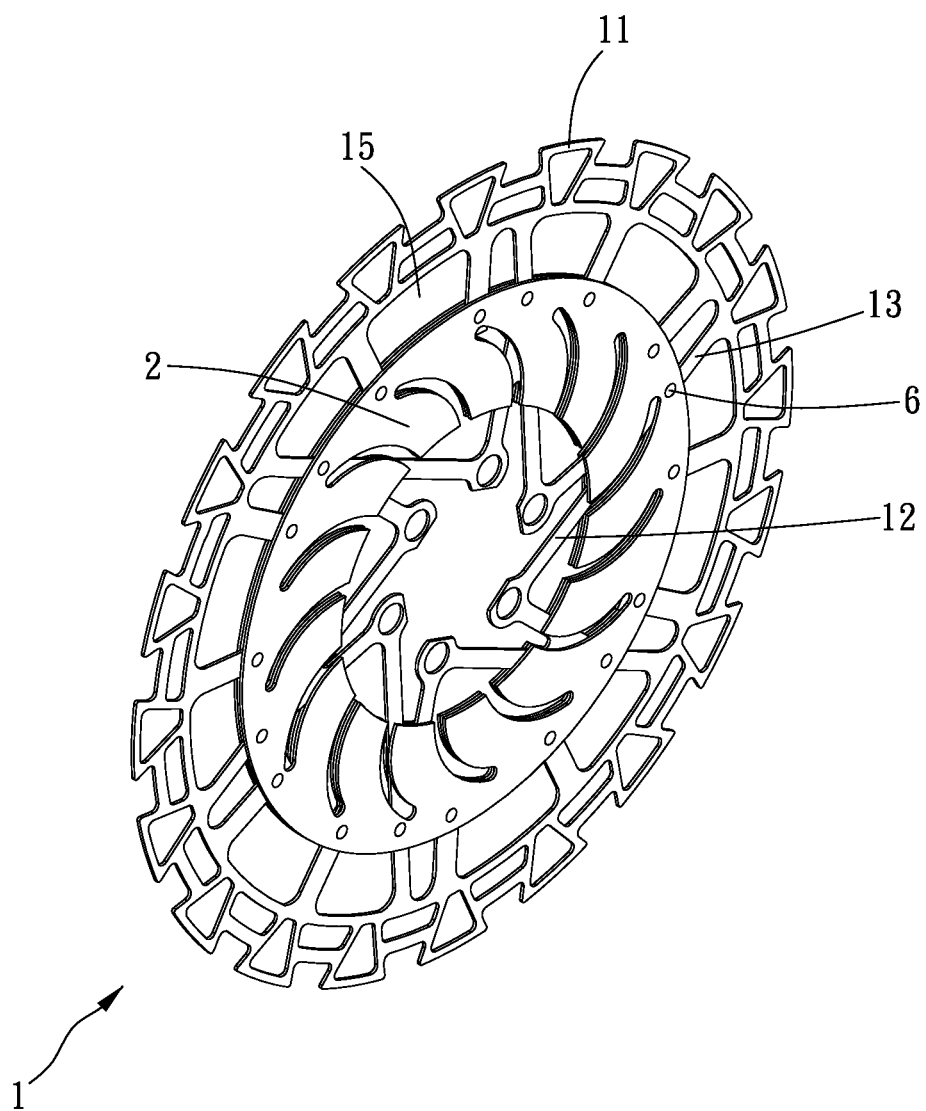
FIG. 1 is a perspective view of a first embodiment of the present invention.
Figure 2:
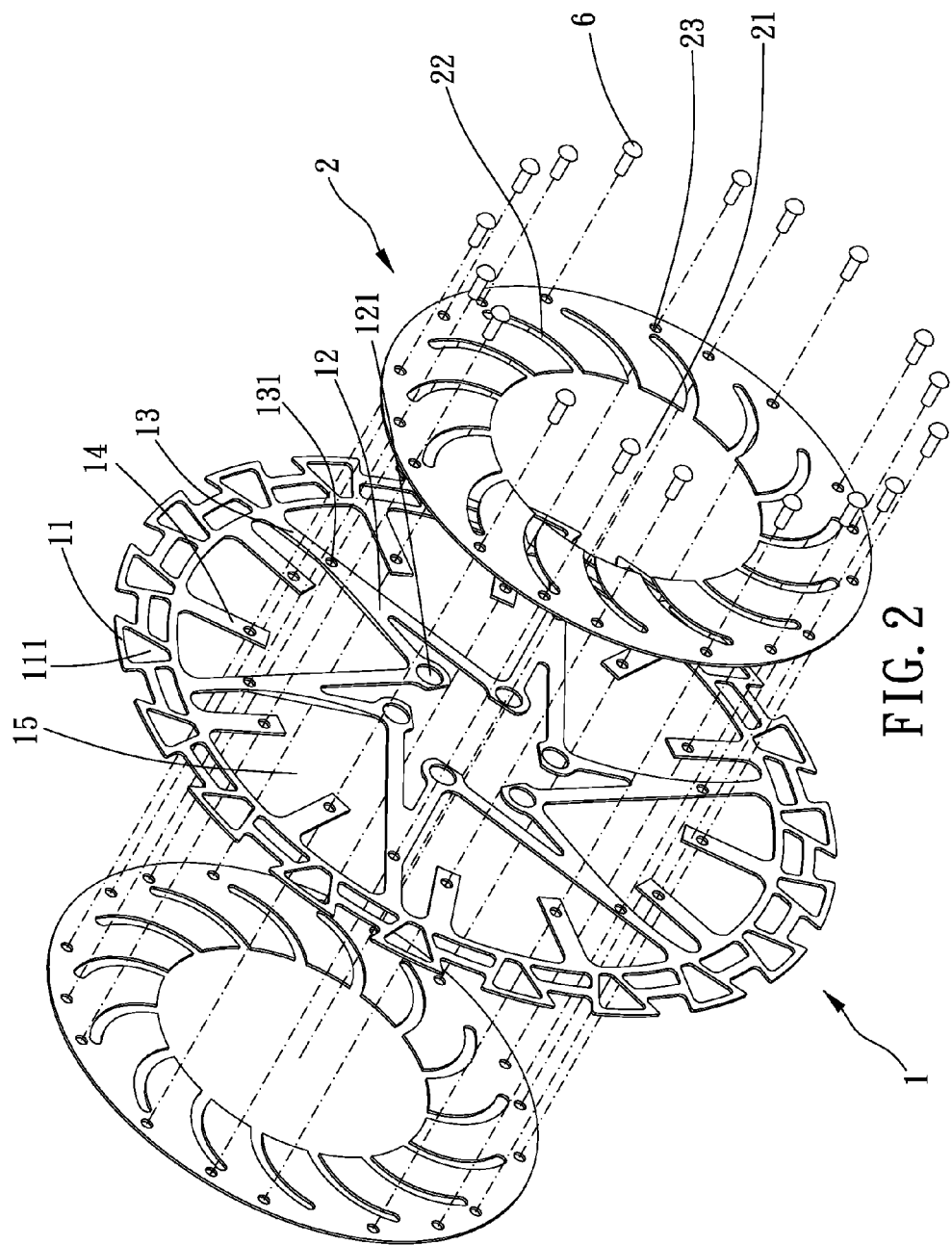
FIG. 2 is an exploded view of the first embodiment of the present invention.
Figures 3, 3A:
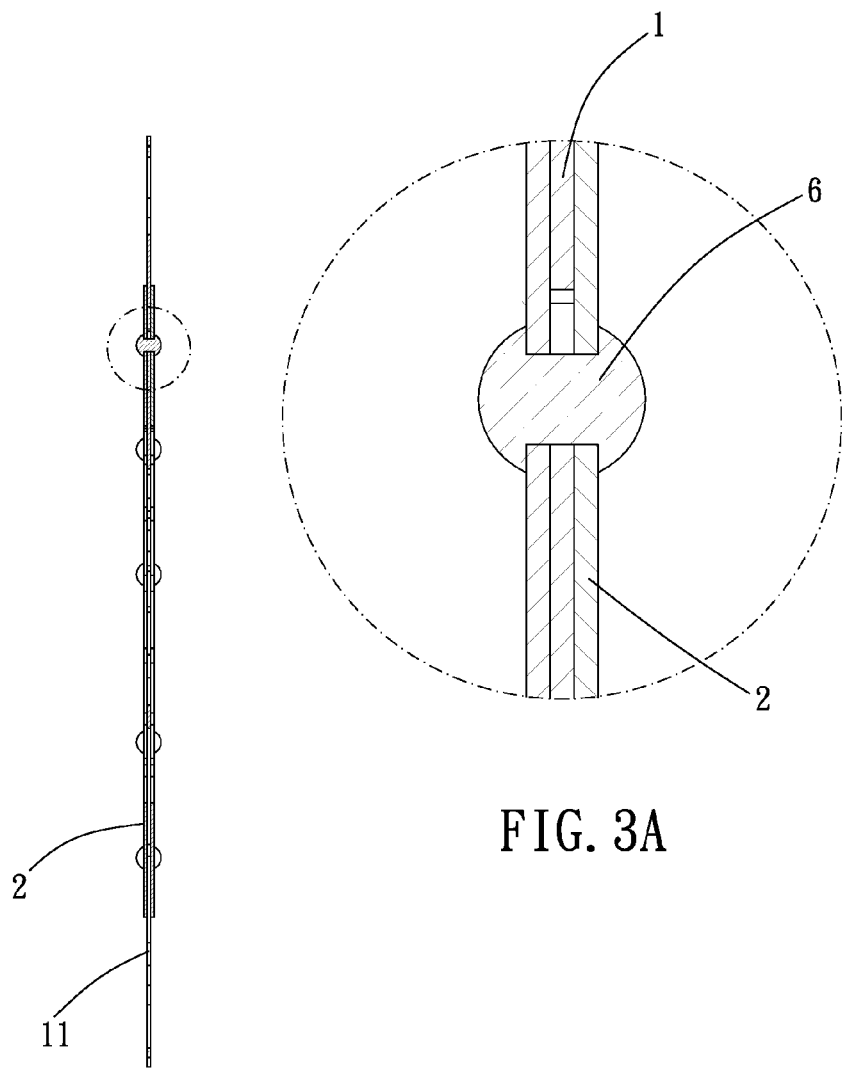
FIG. 3 is a side cross-sectional view of the first embodiment of the present invention.
FIG. 3A is a partial enlarged view of the first embodiment of the present invention for showing a fastener is fixedly connected to a body and two heat dissipation members.

FIGS. 1-3 show a brake disk of a first embodiment of the present invention. The brake disk comprises a body 1 and at least two heat dissipation members 2.

The body 1 is a plate and has an annular portion defined thereon. The annular portion of the body 1 defines a central axis. The annular portion has a brake portion 11 which is remote from the central axis. The brake portion 11 is configured to be clamped by a bike brake device of a bicycle. Preferably, a plurality of heat dissipation holes 111 is disposed through the brake portion 11 of the body 1. The dissipation holes 111 are opened along a direction which is parallel to the central axis. The heat dissipation holes 111 are defined around the central axis so as to increase a surface area, which contacts ambient air, of the brake portion 11. When the brake portion 11 of the body 1 is clamped by the bike brake device, the heat dissipation holes 111 of the brake portion 11 could quickly transmit a brake heat of the brake portion 11 away from the body 1. Comparing an iron material with other metallic materials, the iron material is much cheaper than the other metallic materials and has greater structural strength, so that the body 1 is made of the iron material. Therefore, a production cost of the body 1 could be decreased, and the brake heat of the brake portion 11 which is clamped by the bike brake device would not make the body 1 be deformed.

The body 1 has at least one assembling portion 12 extended toward the central axis for connecting with a bike hub. At least one connecting portion 13 is formed between the assembling portion 12 and the brake portion 11. In the first embodiment of the present invention, the body 1 has plural assembling portions 12 formed thereon, and the connecting portion 13 is formed between each assembling portion 12 and the brake portion 11. Clearly, each assembling portion 12 is formed as substantially V-shaped or Y-shaped, and has two arms. A connecting position of the two arms is connected with the connecting portion 13. The brake portion 11, the connecting portions 13 and the assembling portions 12 are formed as one piece. The annular portion of the body 1 has the connecting portions 13 extended toward the central axis, and each connecting portion 13 has the two arms further extended toward the central axis. Each arm of one assembling portion 12 is connected with the adjacent arm of each adjacent assembling portion 12 being adjacent to one assembling portion 12, so that the assembling portions 12 substantially perform a radial structure, and the assembling portions 12 enclosingly define a substantially star-shaped hole. An assembling hole 121 is formed on a connecting position between two connected arms of every two adjacent assembling portions 12. Thus, the assembling hole 121 is provided for securing the bike hub. The connecting portion 13 has at least one first fixing portion formed thereon. Clearly, the first fixing portion includes a first through hole 131. The first through hole 131 is opened at an inner end, which is close to the central axis, of the connecting portion 13. The first through hole 131 is opened along a direction which is parallel to the central axis. Certainly, in other embodiment of the present invention, the assembling portions 12 could be detachable from the corresponding connecting portion 13.

The two heat dissipation members 2 are respectively located at two corresponding lateral sides of the central axis of the body 1. Clearly, the body 1 has two opposite faces, and the two heat dissipation members 2 are respectively located at two opposite faces so as to increase a heat dissipation velocity and enhance a structural strength of the body 1. Besides, gravity center of a bike would be intermediately defined rather than be inclined. Comparing an aluminum material with the iron material, a transmit efficiency of the aluminum material is much better than that of the iron material, so that the two heat dissipation members 2 are preferably made of the aluminum material or an aluminum alloy material, so as to further increase a heat transmit velocity and a heat transmit efficiency. The two heat dissipation members 2 have the same mode to be assembled to the body 1, so that only one heat dissipation member 2 is further described. In the first embodiment, the heat dissipation member 2 is formed as substantially annular-shaped and is coaxial to the body 1. A circular hole 21 is formed at the center of the heat dissipation member 2. Each heat dissipation member 2 has plural elongated holes 22 which are defined around the central axis. Each elongated hole 22 communicates with the circular hole 21, and the elongated holes 22 are intervally and radially arranged. An outer diameter of the heat dissipation member 2 is smaller than an outer diameter of the body 1, and the heat dissipation member 2 is essentially located between the brake portion 11 and the assembling portions 12. Thus, when the body 1 is clamped by the bike brake device, the bike brake device would not abut against the heat dissipation members 2, so that the heat dissipation members 2 would not be rubbed and broken easily. A brake heat of the brake portion 11 could be transmitted to the two heat dissipation members 2 via the connecting portion 13. The heat dissipation member 2 has at least one second fixing portion. The second fixing portion of the heat dissipation member 2 is fixedly assembled to the first fixing portion of the connecting portion 13. Preferably, the heat dissipation member 2 has plural second fixing portions. A number of the second fixing portions corresponds to a number of the first fixing portions of the connecting portion 13 of the body 1. A position of each second fixing portion corresponds to a position of each corresponding first fixing portion. Clearly, each second fixing portion comprises a second through hole 23. The second through holes 23 are defined around the central axis, and the second through holes 23 are intervally arranged. Each second through hole 23 corresponds to each corresponding first through hole 131 of the first fixing portions. Preferably, the annular portion near the axis of the body 1 has plural heat dissipation portions 14 radially protrudingly extended toward the central axis. The heat dissipation portions 14 are defined around the central axis, and the heat dissipation portions 14 are intervally arranged. Each heat dissipation portions 14 is essentially formed as a rectangular plate. Preferably, a tangent to a connecting position of the dissipation portions 14 and the annular portion of the body 1 is substantially vertical to a linear extending direction of the heat dissipation portions 14. Each heat dissipation member 2 is connected with the connecting portions 13, and is further connected with the heat dissipation portions 14. The heat dissipation member 2 partially overlaps each heat dissipation portion 14. Thus, when the brake portion 11 is clamped by the bike brake device and a brake heat is produced, each heat dissipation portions 14 could transmit said brake heat to the heat dissipation member 2 for increasing heat dissipation efficiency.

It is worthily to mention that the assembling portions 12 enclosingly define the substantially star-shaped hole of the body 1, so that each of plural hollow portions 15 is formed between the annular portion of the body 1 and the assembling portions 12. When the two heat dissipation members 2 are assembled at two corresponding lateral sides of the body 1, the assembling portions 12 are sandwiched in between the two heat dissipation members 2, and a vent gap is formed between the two heat dissipation members 2 at the hollow portions 15 so as to further increase a surface area, which contacts ambient air, of each heat dissipation member 2. Thus, when a bike is driven to rotate the body 1, the air could flow from the vent gap between the two heat dissipation members 2 to the central axis so as to increase vent efficiency, and the heat dissipation efficiency is further enhanced.

In the first embodiment, referring to FIGS. 2 and 3A, the two heat dissipation members 2 is fixedly connected to the body 1 via a fastener 6. Clearly, the fastener 6 is a rivet and has a head portion and a body portion, and a diameter of the head portion is larger than a diameter of the body portion. The body portion of the fastener 6 sequentially passes through the second through hole 23 of one heat dissipation member 2, the first through hole 131 of the connecting portion 13, and second through hole 23 of another heat dissipation member 2. The two heat dissipation members 2 and the body 1 are fixedly connected to each other by striking the body portion. Certainly, in other embodiment, the two heat dissipation members 2 and the body 1 could be fixedly connected to each other by a screw means. Besides, the heat dissipation portions 14 of the body 1 and the heat dissipation portions 14 are riveted together. Thus, the heat dissipation portions 14 could overlap and abut against the heat dissipation members 2. When the brake portion 11 is clamped by the bike brake device, said brake heat could be transmitted through the heat dissipation portions 14 to the two heat dissipation members 2 so as to provide a better heat dissipation efficiency.

Figure 4:
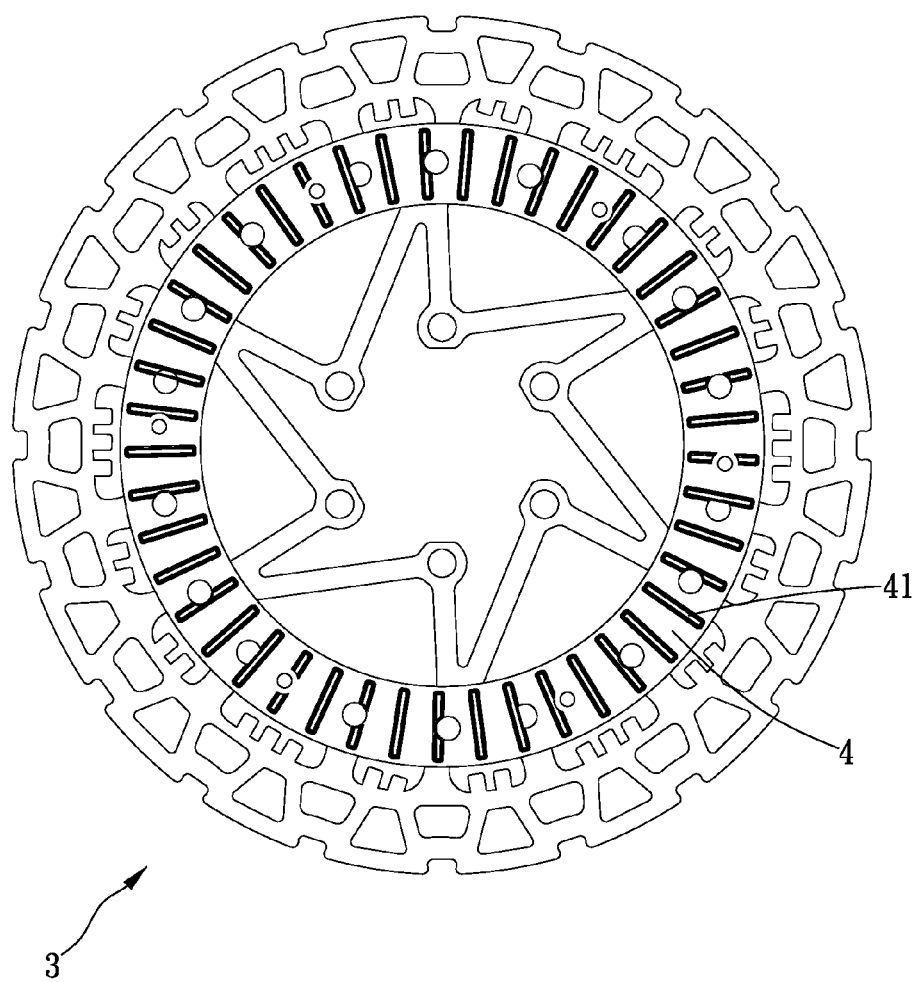
FIG. 4 is a perspective view of a second embodiment of the present invention for showing that plural convex ribs are intervally arranged on another heat dissipation member.
Figure 5:
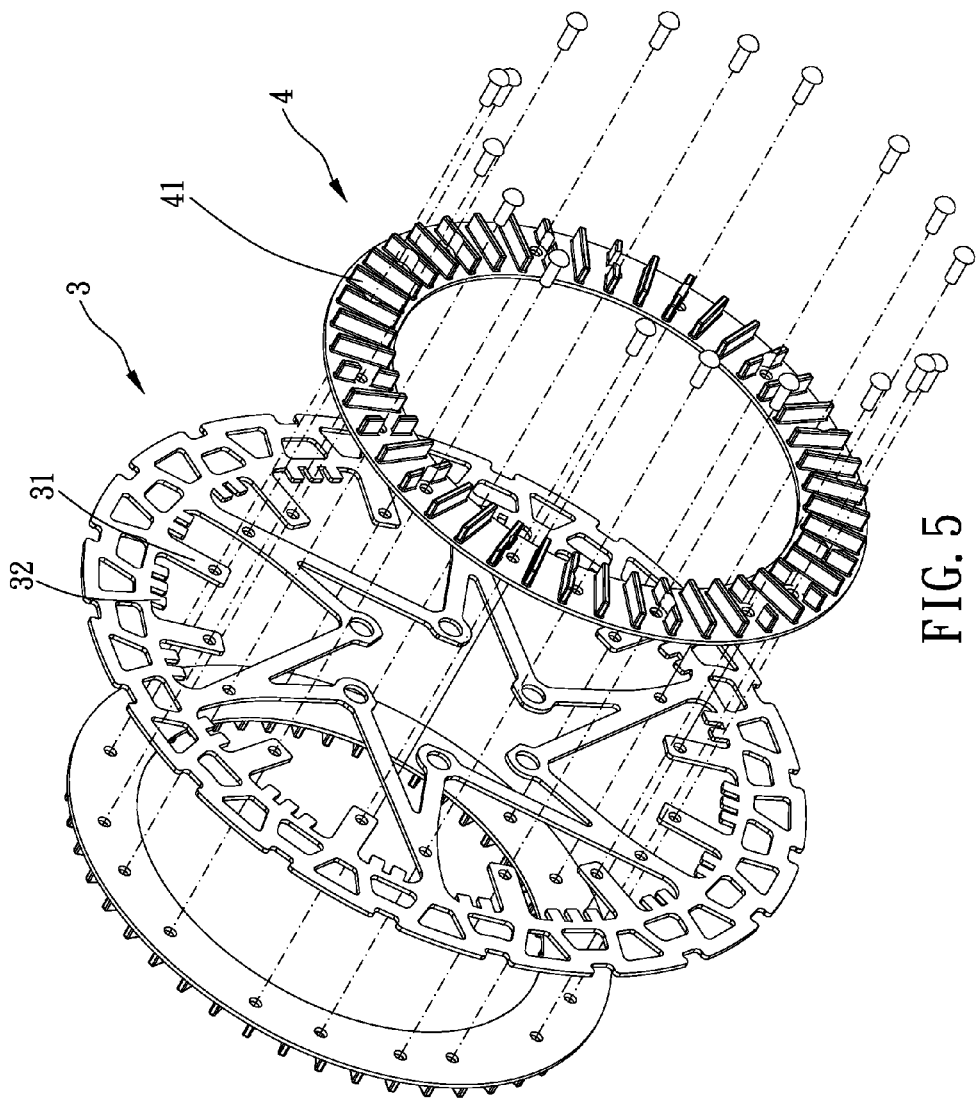
FIG. 5 is an exploded view of the second embodiment of the present invention for showing plural convex portions are intervally arranged on another body.

In a second embodiment, referring to FIGS. 4-5, a difference between the second embodiment and the first embodiment is that the body 3 has at least one convex portion 32 formed between two adjacent heat dissipation portions 31, and the convex portion 32 is radially extended toward the central axis for increasing a surface area, which contacts ambient air, of the body 3. Besides, the heat dissipation member 4 does not have the elongated hole in the second embodiment. The heat dissipation member 4 has plural convex ribs 41 formed at a side thereof which is opposite to the body 3, for increasing a surface area, which contacts ambient air, of the heat dissipation member 4, so that a heat dissipation efficiency is further improved. The convex ribs 41 are defined around the central axis. Each convex rib 41 protrudes in the direction parallel to the central axis.

Figure 6:
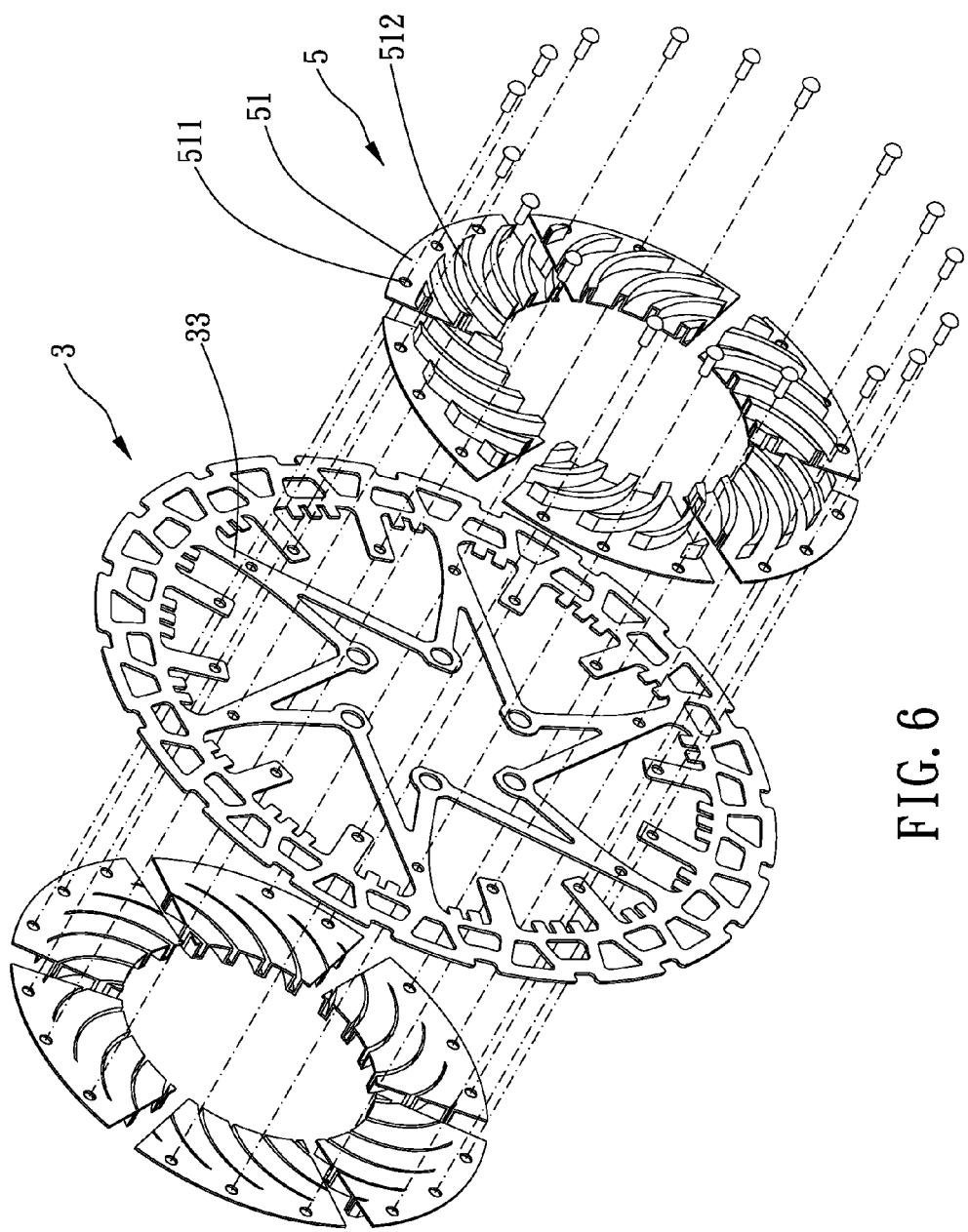
FIG. 6 is an exploded view of a third embodiment of the present invention for showing plural convex ribs are formed as arc-shaped.

In a third embodiment, referring to FIG. 6, a difference between the third embodiment and said embodiments is that each heat dissipation member 5 includes plural heat dissipation blocks 51. The heat dissipation blocks 51 are arranged on the body 3 in sequence and are defined around the central axis. Each heat dissipation block 51 has at least one second fixing portion formed thereon. Each second fixing portion comprises a second through hole 511. The second fixing portion of each heat dissipation block 51 is assembled to the first fixing portion of the connecting position 33 of the body 3 so as to fixedly connect the heat dissipation block 51 to the body 3. The heat dissipation block 51 and the body 3 are riveted together as said rivet bonding mode of the first embodiment. Each heat dissipation block 51 has plural convex ribs 512 formed at a side thereof which is opposite to the body 3, for increasing a surface area, which contacts ambient air, of the heat dissipation block 51. Each convex rib 512 protrudes in the direction parallel to the central axis.

When the brake disk is driven (take the body 1 of the first embodiment as a specification), the assembling portion 12 could be assembled to the bike hub (not shown) to make the body 1 connect with a bike wheel, so that the body 1 could be driven by the bike wheel. A user could control and drive the bike brake device to clamp the brake portion 11 of the body 1 for braking the bike. The brake portion 11 of the body 1 is clamped by the bike brake device when the body 1 is rotated, so that a high brake heat would be produced. The two heat dissipation members 2 are respectively located at two corresponding lateral sides of the body 1. The fastener 6 is fixedly connected to the two heat dissipation members 2 and the body 1. Each heat dissipation member 2 is located between the brake portion 11 and the assembling portions 12 so as to reduce a heat transmit path. Therefore, the brake heat which is produced by said clamp could be quickly transmitted through the connecting portion 13 of the body 1 to the two heat dissipation members 2. Besides, each heat dissipation member 2 has plural elongated holes 22. Each elongated hole 22 communicates with the circular hole 21 of the heat dissipation member 2 so as to increase a surface area, which contacts ambient air, of the heat dissipation member 2, and the heat dissipation efficiency is further improved. Thus, said high brake heat of the body 1 could be diffused, and the body 1 would not be deformed or broken easily so as to avoid a fail-safe brake problem. Moreover, when the body 1 is clamped by the bike brake device, the heat dissipation portion 14 would be clamped by the bike brake device also. The heat dissipation portions 14 could abut against the heat dissipation members 2, and an area of the heat dissipation member 2 partially overlaps the heat dissipation portions 14, so that said brake heat could be transmitted through the connecting portion 13 to the two heat dissipation members 2, and a heat transmitting velocity and a heat dissipation efficiency would be better. Said brake heat would not be transmitted through the assembling portions 12 to the bike hub, so that a temperature of the bike hub would not be increased. Besides, an outer diameter of the heat dissipation member 2 is smaller than an outer diameter of the body 1. When the body 1 is clamped by the bike brake device, the bike brake device would not abut against the heat dissipation members 2, so that the heat dissipation members 2 would not be rubbed and broken easily.

Under above arrangement, the brake disk of the present invention is simplifying and practical. Said heat transmitting path could be reduced by the heat dissipation members 2, and said brake head could be transmitted through the connecting portion 13 to the two heat dissipation members 2 so as to increase a heat dissipation velocity and enhance a structural strength of the body 1.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A brake disk comprising:
a body formed integrally having an annular portion defined thereon, the annular portion of the body defining a central axis, the annular portion having a brake portion which is remote from the central axis for a bike brake device to clamp the brake portion, the body having at least one assembling portion extended toward the central axis for connecting with a bike hub, at least one connecting portion formed between the assembling portion and the brake portion, the connecting portion having at least one first fixing portion formed thereon; and
at least two heat dissipation members respectively assembled at two corresponding lateral sides of the connecting portion, each heat dissipation member having at least one second fixing portion, the second fixing portion fixedly assembled to the first fixing portion;
wherein the at least one assembling portion includes plural assembling portions formed thereon; each assembling portion is formed as substantially V-shaped or Y-shaped and has two arms; a connecting position of the two arms is connected with the connecting portion; each arm of each of the plural assembling portion is connected with an adjacent arm of an adjacent one of the plural assembling portion, so that the assembling portions perform as substantially a radial structure; an assembling hole is formed on one said connecting position between two connected arms of every two adjacent assembling portions.

2. The brake disk as claimed in claim 1, wherein each heat dissipation member is formed as substantially annular-shaped and is coaxial to the body; each heat dissipation member is made of an aluminum alloy; a circular hole is formed at the center of the heat dissipation member; each heat dissipation member has a plurality of elongated holes defined around the central axis; each elongated hole communicates with the circular hole.

3. The brake disk as claimed in claim 1, wherein the annular portion near the axis of the body has a plurality of heat dissipation portions radially protrudingly extended toward the central axis; the heat dissipation portions are defined around the central axis, and the heat dissipation portions are intervally arranged; each heat dissipation member is connected with the heat dissipation portions, and the heat dissipation member partially overlaps each heat dissipation portion.

4. The brake disk as claimed in claim 3, wherein the body has at least one convex portion formed between each two adjacent heat dissipation portions, and the convex portion is radially extended toward the central axis for increasing a surface area, which contacts ambient air, of the body.

5. The brake disk as claimed in claim 1, wherein plural heat dissipation holes are disposed through the brake portion along a direction which is parallel to the central axis; the heat dissipation holes are defined around the central axis.

6. The brake disk as claimed in claim 1, wherein each heat dissipation member is formed as substantially annular-shaped and is coaxial to the body; each heat dissipation member has plural convex ribs formed at a side thereof which is opposite to the body, for increasing a surface area, which contacts ambient air, of the heat dissipation member; the convex ribs are defined around the central axis; each convex rib protrudes in a direction parallel to the central axis.

7. The brake disk as claimed in claim 1, wherein each heat dissipation member includes plural heat dissipation blocks; the heat dissipation blocks are arranged on the body in sequence and are defined around the central axis; each heat dissipation block has at least one second fixing portion formed thereon; the second fixing portion of each heat dissipation block is assembled to the first fixing portion of the connecting position of the body so as to fixedly connect the heat dissipation member to the body.

8. The brake disk as claimed in claim 7, wherein each heat dissipation block has plural convex ribs formed at a side thereof which is opposite to the body, for increasing a surface area, which contacts ambient air, of the heat dissipation member; each convex rib protrudes in a direction parallel to the central axis.

\* \* \* \* \*